United States Patent
Cao et al.

(10) Patent No.: US 11,137,483 B2
(45) Date of Patent: Oct. 5, 2021

(54) LIGHT SCANNER

(71) Applicant: Shenzhen Genorivision Technology Co. Ltd., Shenzhen (CN)

(72) Inventors: Peiyan Cao, Shenzhen (CN); Yurun Liu, Shenzhen (CN)

(73) Assignee: SHENZHEN GENORIVISION TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 17/130,521

(22) Filed: Dec. 22, 2020

(65) Prior Publication Data

US 2021/0109200 A1    Apr. 15, 2021

Related U.S. Application Data

(63) Continuation of application No. PCT/CN2018/095521, filed on Jul. 12, 2018.

(51) Int. Cl.
*G02B 26/08* (2006.01)
*G01S 7/481* (2006.01)

(52) U.S. Cl.
CPC .................. *G01S 7/4817* (2013.01)

(58) Field of Classification Search
CPC ........ G01S 7/4817; G02B 26/10; G02B 6/122
See application file for complete search history.

(56) References Cited

U.S. PATENT DOCUMENTS

| | | | |
|---|---|---|---|
| 4,900,138 A | 2/1990 | Atkinson, III et al. | |
| 5,703,351 A | 12/1997 | Meyers | |
| 5,859,715 A | 1/1999 | Meyers et al. | |
| 6,448,997 B1 | 9/2002 | Koide | |
| 2002/0027696 A1 | 3/2002 | Baba et al. | |
| 2005/0269721 A1* | 12/2005 | Adileh | B29C 66/81455 264/1.32 |
| 2010/0039707 A1* | 2/2010 | Akahane | G02B 3/0012 359/576 |
| 2010/0044105 A1* | 2/2010 | Faircloth | E21B 29/00 175/16 |
| 2016/0176221 A1* | 6/2016 | Holmes | B42D 25/405 283/77 |

FOREIGN PATENT DOCUMENTS

JP        2003195002 A     7/2003

\* cited by examiner

*Primary Examiner* — Samantha K Nickerson
(74) *Attorney, Agent, or Firm* — IPro, PLLC; Qian Gu; Na Xu

(57) ABSTRACT

Disclosed herein is an apparatus suitable for light scanning. The apparatus comprises a light source and a photonic crystal. The light source is configured to direct a light beam along an optical axis toward the photonic crystal. The photonic crystal is configured to direct the light beam along a direction at an angle relative to the optical axis. The angle is a function of wavelength of the light beam. The apparatus may also comprise a partial toroid lens configured to diverge the light beam received from the photonic crystal. The light source of the apparatus may be configured to change the wavelength continuously across a range of wavelengths.

18 Claims, 9 Drawing Sheets

LIGHT SCANNER

TECHNICAL FIELD

The disclosure herein relates to light scanners.

BACKGROUND

Lidar is a laser-based method of detection, range finding and mapping, which uses a technology similar to radar. There are several major components to a lidar system: laser, scanner and optics, photo detectors and receiver electronics. For example, controlled steering of scanning laser beams is carried out, and by processing the captured return signals reflected from distant objects, buildings and landscapes, distances and shapes of these objects, buildings and landscapes may be obtained.

Lidar is widely used. For example, autonomous vehicles (e.g., driverless cars) use lidar (also known as on-vehicle lidar) for obstacle detection and collision avoidance to navigate safely through environments. An on-vehicle lidar is mounted on the roof of a driverless car and it rotates constantly to monitor the current environment around the car. The lidar sensor provides the necessary data for software to determine where potential obstacles exist in the environment, help identify the spatial structure of the obstacle, distinguish objects based on size and estimate the impact of driving over it. One advantage of the lidar systems compared to radar systems is that the lidar systems can provide better range and a large field of view, which helps detecting obstacles on the curves. Despite tremendous progress has been made in developing lidar systems in recent years, a lot of efforts are still being made these days to design lidar systems for various application needs, including developing new light sources that can perform controlled scanning, improving return signal detection.

SUMMARY

Disclosed herein is an apparatus, comprising: a light source, and a photonic crystal. The light source is configured to direct a light beam along an optical axis toward the photonic crystal. The photonic crystal is configured to direct the light beam along a direction at an angle relative to the optical axis. The angle is a function of wavelength of the light beam. The apparatus may comprise a partial toroid lens configured to diverge the light beam received from the photonic crystal.

According to an embodiment, the light source is configured to change the wavelength continuously across a range of wavelengths.

According to an embodiment, the range of wavelength is within 700 nm-1 mm.

According to an embodiment, the range of wavelength is within 400 nm-700 nm.

According to an embodiment, a derivative of the angle with respect to the wavelength is greater than 1.8°/nm.

According to an embodiment, a derivative of the angle with respect to the wavelength is greater than 2.1°/nm.

According to an embodiment, the partial toroid lens comprises a section of a toroid.

According to an embodiment, the section has a toroidal angle greater than 90°.

According to an embodiment, the partial toroid lens is configured to diverge the light beam continuously along a dimension.

According to an embodiment, the partial toroid lens is configured to diverge the light beam into a plurality of discrete directions.

According to an embodiment, the partial toroid lens is configured to direct the light beam toward a target scene.

According to an embodiment, the apparatus further comprises a detector configured to detect a portion of the light beam scattered by the target scene.

According to an embodiment, the detector comprises a first cylindrical lens and a second cylindrical lens, and the first cylindrical lens is positioned between the target scene and the second cylindrical lens.

According to an embodiment, the first cylindrical lens is configured to converge in a first dimension the portion of the light beam, and the second cylindrical lens is configured to converge in a second dimension the portion of the light beam after it passes through the first cylindrical lens.

According to an embodiment, a focal length of the first cylindrical lens and a focal length of the second cylindrical lens are positive, and the focal length of the first cylindrical lens is shorter than the focal length of the second cylindrical lens.

According to an embodiment, the detector is configured to generate electrical signals based on the portion of the light beam.

According to an embodiment, the apparatus further comprises a processor configured to process and analyze the electrical signals.

According to an embodiment, the light beam is a laser beam.

DETAILED DESCRIPTION

Figure 1:
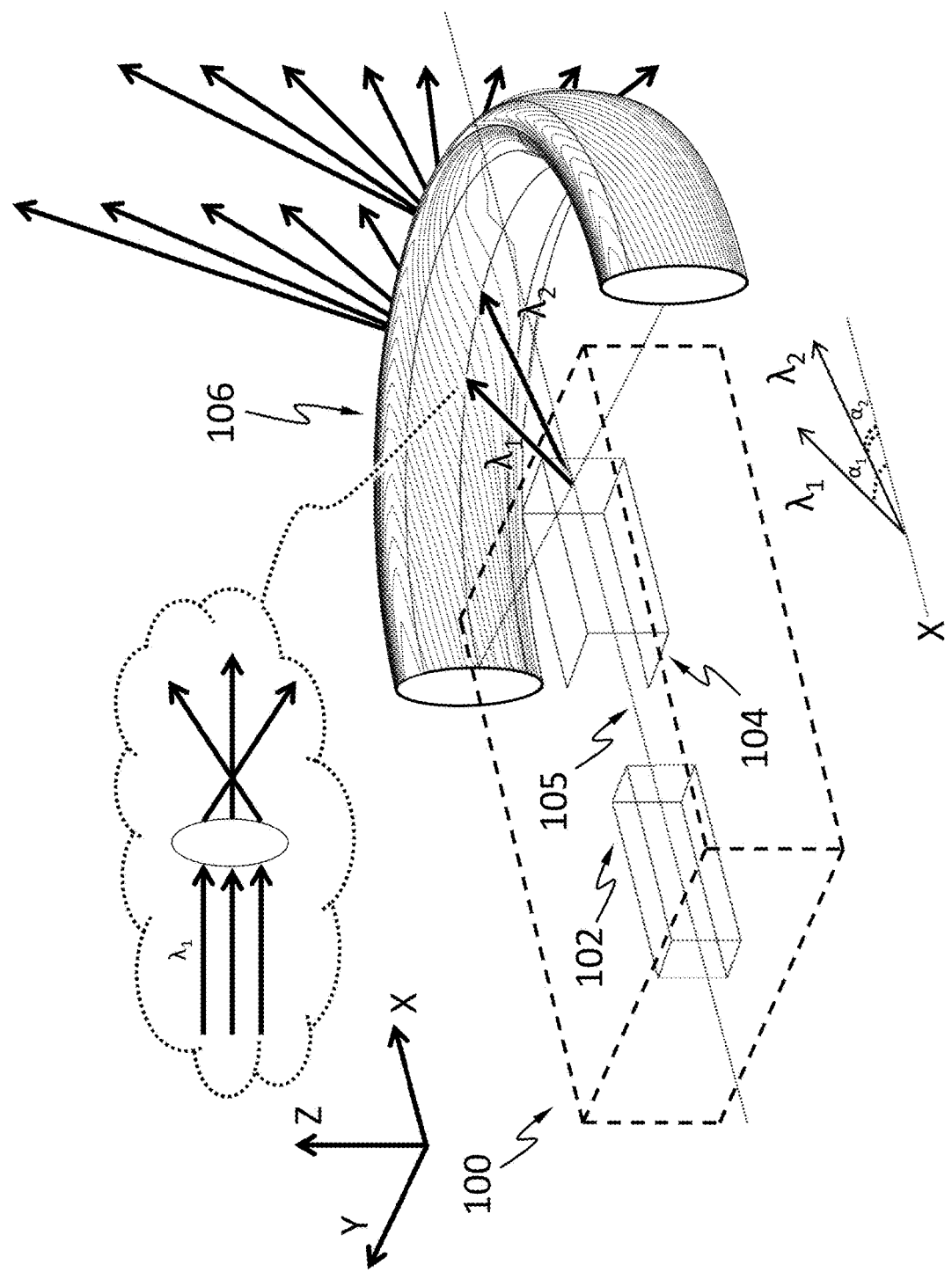
FIG. 1 schematically shows an apparatus suitable for light scanning, according to an embodiment.

FIG. 1 schematically shows an apparatus 100 suitable for light scanning, according to an embodiment. The apparatus 100 may have a light source 102 and a photonic crystal 104. The light source 102 is configured to direct a light beam along an optical axis 105 toward the photonic crystal 104. The photonic crystal 104 is configured to direct the light beam it receives along a direction at an angle relative to the optical axis 105, toward a partial toroid lens 106. The angle depends on the wavelength of the light beam. The partial toroid lens 106 may be part of the apparatus 100. The partial toroid lens 106 is configured to diverge the light beam it receives from the photonic crystal 104.

Figure 2:
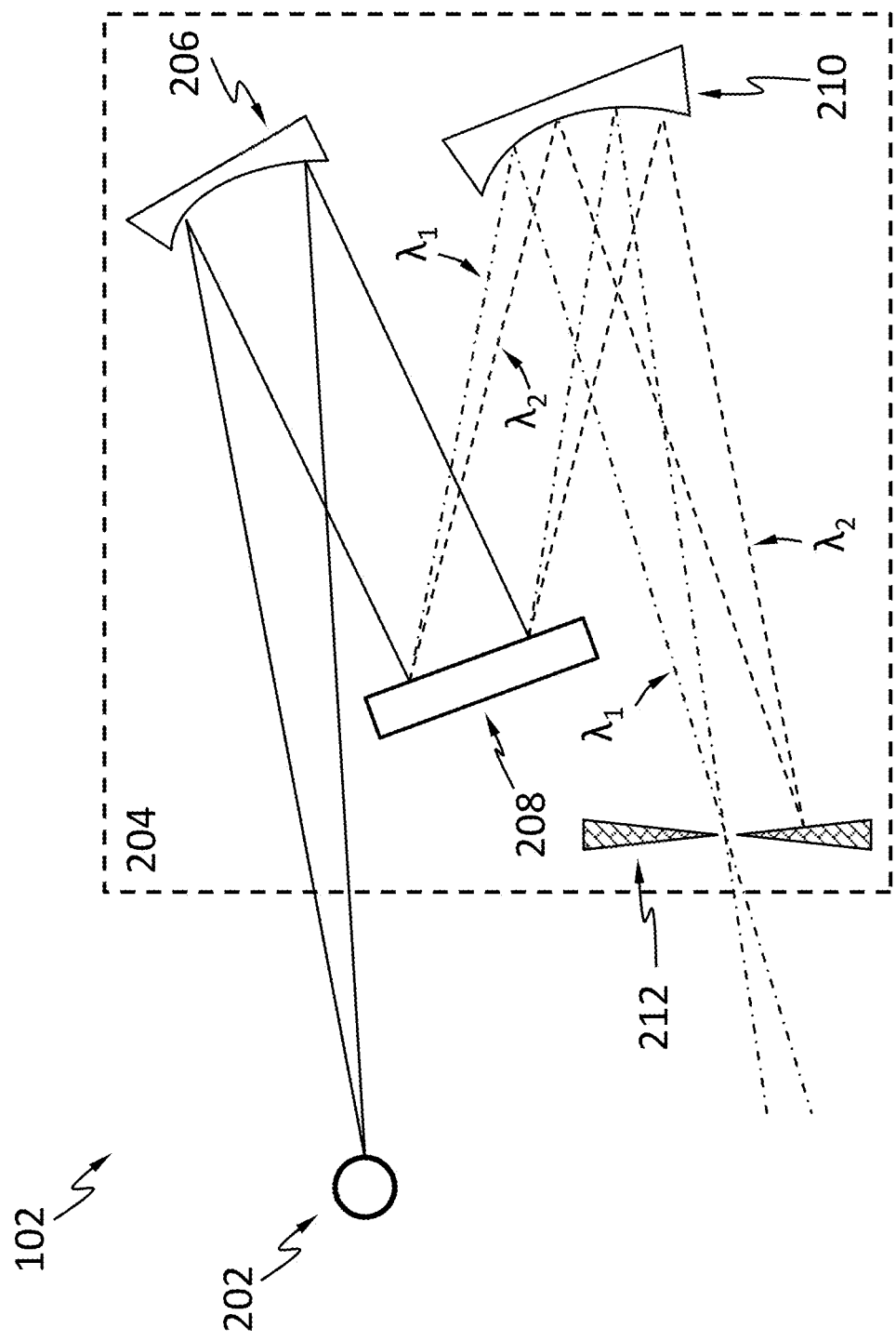
FIG. 2 schematically shows a light source of FIG. 1, according to an embodiment.

The light source 102 may be able to change the wavelength of the light beam it produces. In an example shown in FIG. 2, the light source 102 may have an illuminator 202 and a monochromator 204. The illuminator 202 may have a continuous emission spectrum. Examples of the illuminator 202 may include a fluorescent lamp, an incandescent lamp, and a "white" LED. The monochromator 204 can be based on dispersion of a prism, diffraction of a grating, or another suitable mechanism. In the example shown in FIG. 2, the monochromator 204 has a collimating mirror 206, a grating 208, a focusing mirror 210, and an exit slit 212. The illuminator 202 emits light towards the collimating mirror 206. The collimating mirror 206 reflects the light as a collimated light beam toward the grating 208. The grating 208 diffracts the collimated light beam toward the focusing mirror 210. The angle of diffraction of the grating 208 is a function of the wavelength of the light. In the example shown in FIG. 2, the dash-dotted lines and the dotted lines respectively represent light with wavelength $\lambda_1$ and wavelength $\lambda_2$ diffracted from the grating 208. The light diffracted by the grating 208 is focused by the focusing mirror 210 to locations at the focal plane of the focusing mirror 210 depending on the wavelength of the light. By positioning the exit slit 212 at a location at the focal plane of the focusing mirror 210, a wavelength may be selected, i.e., allowed to exit from the exit slit 212. In the example shown in FIG. 2, the light with the wavelength $\lambda_1$ is selected and the light with the wavelength $\lambda_2$ is blocked. By moving the exit slit 212, rotating the grating 208, rotating the focusing mirror 210 or other suitable adjustments to the light source 102, the wavelength of the light produced by the light source 102 can be changed.

Figure 3:
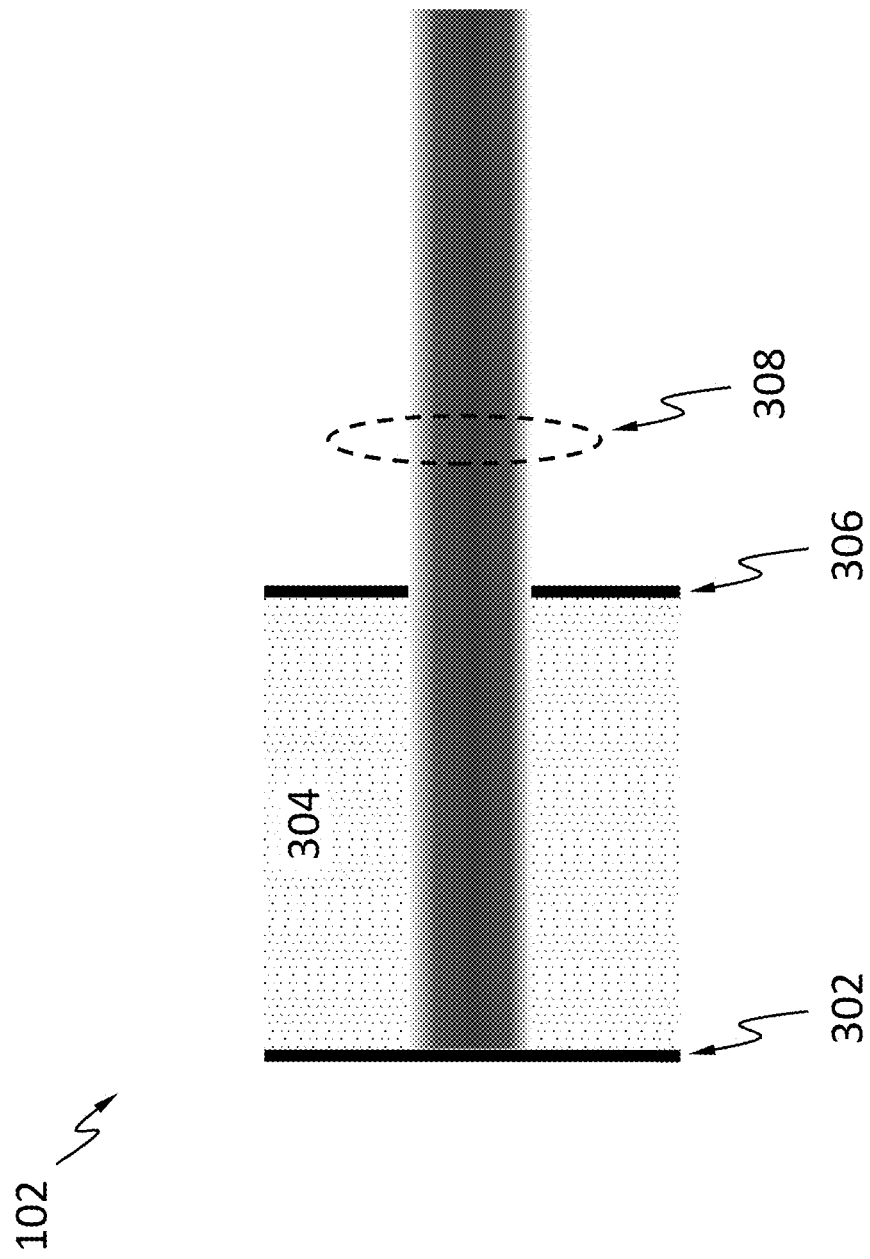
FIG. 3 schematically shows a light source of FIG. 1, according to an embodiment.

In an example, the light source 102 may have a tunable laser. One example of a tunable laser changes the wavelength of the light beam it produces by thermally changing the dimension of an optical cavity. In the example shown by FIG. 3, the light source 102 may have a gain medium 304, a mirror 302 and a partial mirror 306 on either side of the gain medium 304, and optionally a lens 308. The mirror 302, the partial mirror 306 and the gain medium 304 form an optical cavity in which amplification occurs. The wavelength of the laser depends on the geometric dimensions of the optical cavity. Therefore, by changing the geometric dimensions of the optical cavity, the wavelength of the light beam produced by the light source 102 may be tuned. One way of changing the geometric dimensions of the optical cavity is by changing the temperature of the gain medium 304, causing it to expand or shrink.

Another example of the tunable laser is the Sample Grating Distributed Bragg Reflector laser (SG-DBR). It may use Vernier tunable Bragg mirrors and a phase section to achieve a tunable range greater than 50 nm.

Yet another example of the tunable laser is an external cavity laser, which uses a MEMS structure to tune the length of the optical cavity or a multiple-prism grating arrangement to tune the wavelength.

The light source 102 may be able to change the wavelength continuously across a range of wavelengths. In an embodiment, the range of wavelength for the light source 102 is 700 nm-1 mm. In an embodiment, the range of wavelength for the light source 102 is 400 nm-700 nm. The light source 102 may be able to change the wavelength among discrete ranges of wavelengths.

The light source 102 may produce a light beam with wavelengths in multiple discrete ranges at the same time. For example, the light beam may be a mixture of blue light with a wavelength of 450 nm and light with a wavelength of 650 nm.

Photonic crystals are composed of periodic dielectric, metallo-dielectric, or superconductor microstructures or nanostructures that affect electromagnetic wave propagation in the similar way that the periodic potential in a semiconductor crystal affects electron motion by defining allowed and forbidden electronic energy bands. Photonic crystals contain regularly repeating regions of high and low dielectric constant. Photons either propagate through a photonic crystal or are blocked by it, depending on their wavelength. The photonic crystal 104 may be configured to direct the light beam, which is emitted from the light source 102 along the optical axis 105, along a direction at an angle relative to the optical axis 105. The angle is a function of wavelength of the light beam.

In an embodiment, the photonic crystal 104 is in a form of a prism, which is called superprism. Compared to a prism made of conventional medium, the superprism can refract light with a much large refraction angle. For example, a superprism can have a dispersion capability 500 times stronger than a prism made of a conventional medium. In a superprism, the direction of light propagation is very sensitive to the wavelength. In an embodiment, the derivative of the angle with respect to the wavelength is greater than 1.8°/nm. In another embodiment, the derivative of the angle with respect to the wavelength is greater than 2.1°/nm.

The partial toroid lens 106 comprises a section of a toroid. A toroid is a surface of revolution with a hole in the middle, like a doughnut, forming a solid body. The axis of revolution passes through the hole and does not intersect the surface. For example, when a rectangle is rotated around an axis parallel to one of its edges, then a hollow rectangle-section ring is produced. A torus is a special case of a toroid, where the revolved figure is a circle. A section of a toroid is the portion of the toroid between two planes, each of which includes the axis of revolution. The angle between the two planes is called the toroidal angle. The cross-section of the partial toroid lens 106 with a plane including the axis of revolution may be any suitable shape, such as biconvex (e.g., as shown in the inset of FIG. 1), plano-convex, positive meniscus, negative meniscus, plano-concave, and biconcave. In an embodiment, the section has a toroidal angle greater than 90°. In an embodiment, the partial toroid lens 106 is configured to diverge the light beam continuously along a dimension. In an embodiment, the partial toroid lens 106 is configured to diverge the light beam into a plurality of discrete directions. For example, as shown in FIG. 1, the partial toroid lens 106 can diverge the light beam (e.g., with wavelength $\lambda_1$ or wavelength $\lambda_2$) into a number of discrete directions represented by the outgoing arrows spaced apart in the Z direction. The partial toroid lens 106 is configured to direct the light beam toward a target scene.

Figure 4:
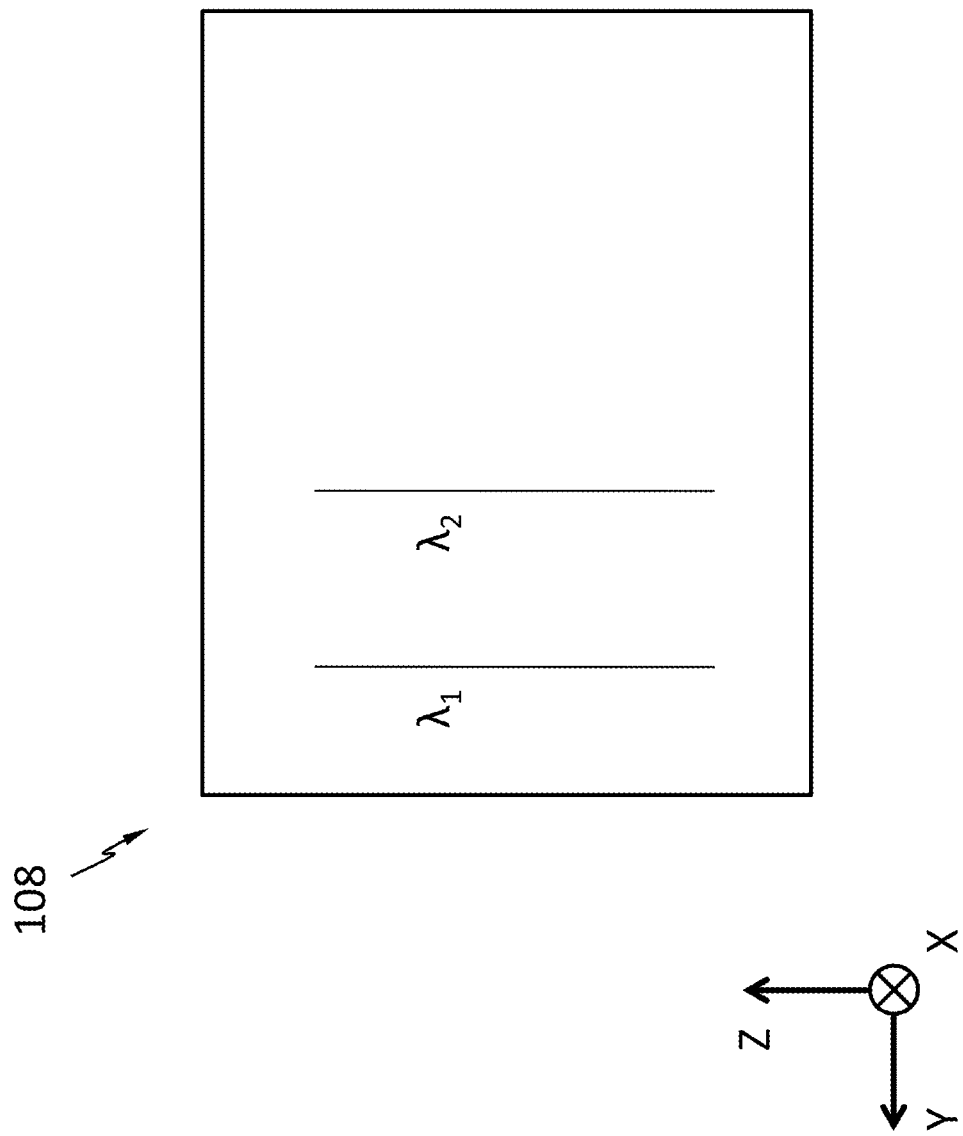
FIG. 4 schematically shows that a target scene can be scanned by changing the wavelength of light from a light source.

FIG. 4 schematically shows that a target scene 108 can be scanned by changing the wavelength of light from a light source using the apparatus 100. In this example, when the wavelength is changed from $\lambda_1$ to $\lambda_2$, the light scans the target scene 108 from the left side to the right side of this view in FIG. 4 along the –Y direction.

In an embodiment, the scanning light beam emitted from the apparatus 100 is a laser beam.

In the example of FIG. 1, along the X direction, the light source 102 of the apparatus 100 can emit a light beam with the wavelength $\lambda_1$ toward the photonic crystal 104. The photonic crystal 104 can direct the light beam along a direction in the X-Y plane, with an angle $\alpha_1$ relative to the X direction, toward the partial toroid lens 106. The partial toroid lens 106 diverges the light beam along the Z direction and directs it toward the target scene 108. The diverged light beam with the wavelength $\lambda_1$ illuminates a line extending in the Z direction in the target scene 108. At a different time, the light source 102 of the apparatus 100 can emit another light beam with the wavelength $\lambda_2$ toward the photonic crystal 104. The photonic crystal 104 can direct the light beam along a direction in the X-Y plane, with an angle $\alpha_2$ relative to the X direction, toward the partial toroid lens 106. The angles $\alpha_1$ and $\alpha_2$ are different if the wavelengths $\lambda_1$ and $\lambda_2$ are different. The partial toroid lens 106 diverges the light beam along Z direction and directs it toward the target scene 108. The diverged light beam with the wavelength $\lambda_2$ illuminates another line extending in the Z direction in the target scene 108, different from the line illuminated by the light beam with the wavelength $\lambda_1$, as shown in FIG. 4.

Figure 5:
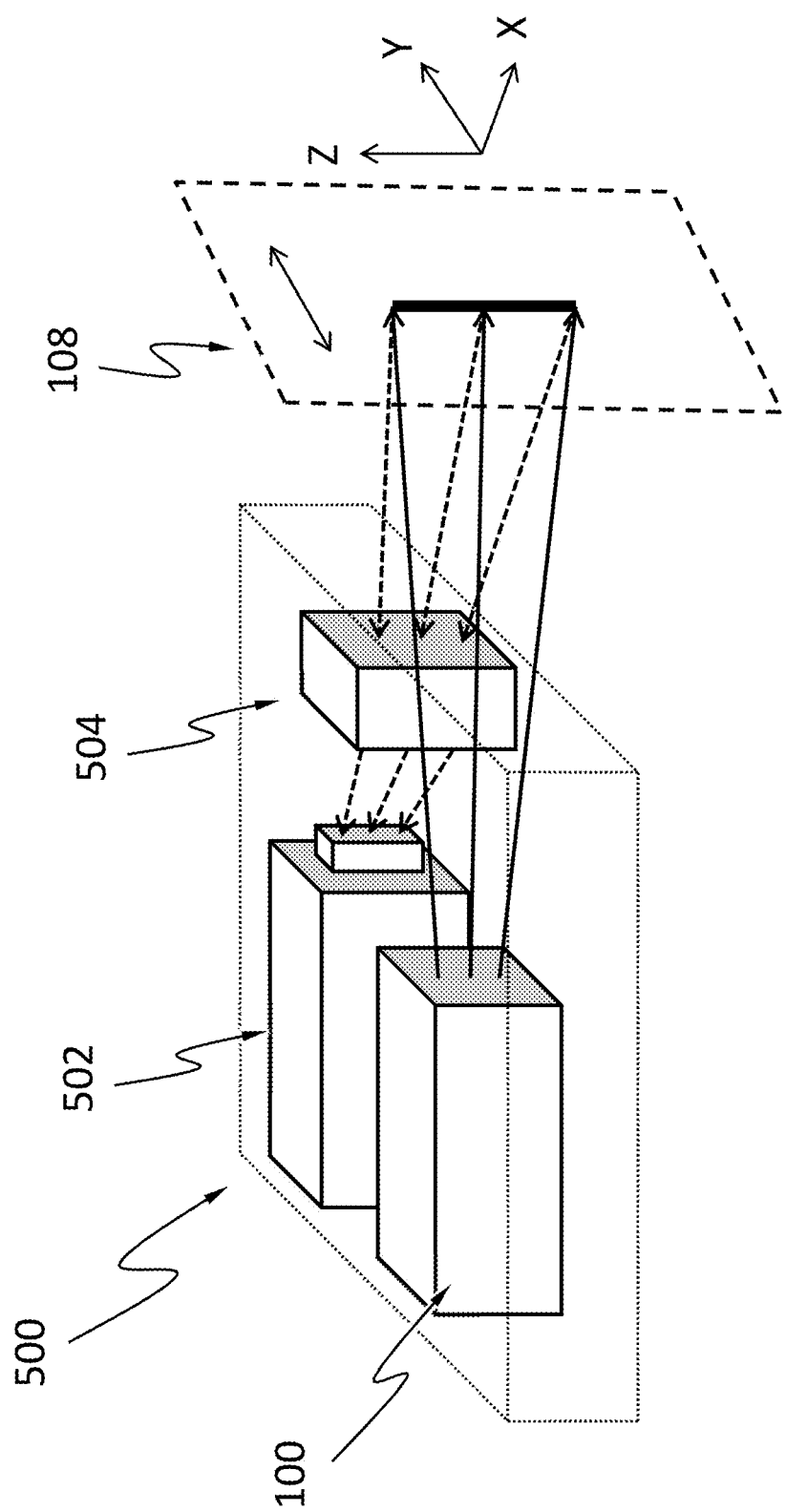
FIG. 5 schematically shows a system including the apparatus of FIG. 1, according to an embodiment.

FIG. 5 schematically shows a system 500 including the apparatus 100, according to an embodiment. The system 500 may also comprise a detector 502. The apparatus 100 may emit scanning light beam to illuminate a target scene 108 as described above. The detector 502 may be configured to detect a portion of the light beam scattered by the target scene 108.

The detector 502 may have optics 504 configured to converge the portion of the light beam scattered by the target scene 108 to generate converged return light waves. The detector 502 may comprise a light receiver. The light receiver may be configured to receive the converged return light waves, and the detector 502 may be configured to detect the converged return light waves incident on the light receiver. In one embodiment, the detector 502 may be configured to generate electrical signals based on the converged return light waves detected. The detector 502 may further comprise a signal processor configured to process and analyze the electrical signals.

Figure 6A:
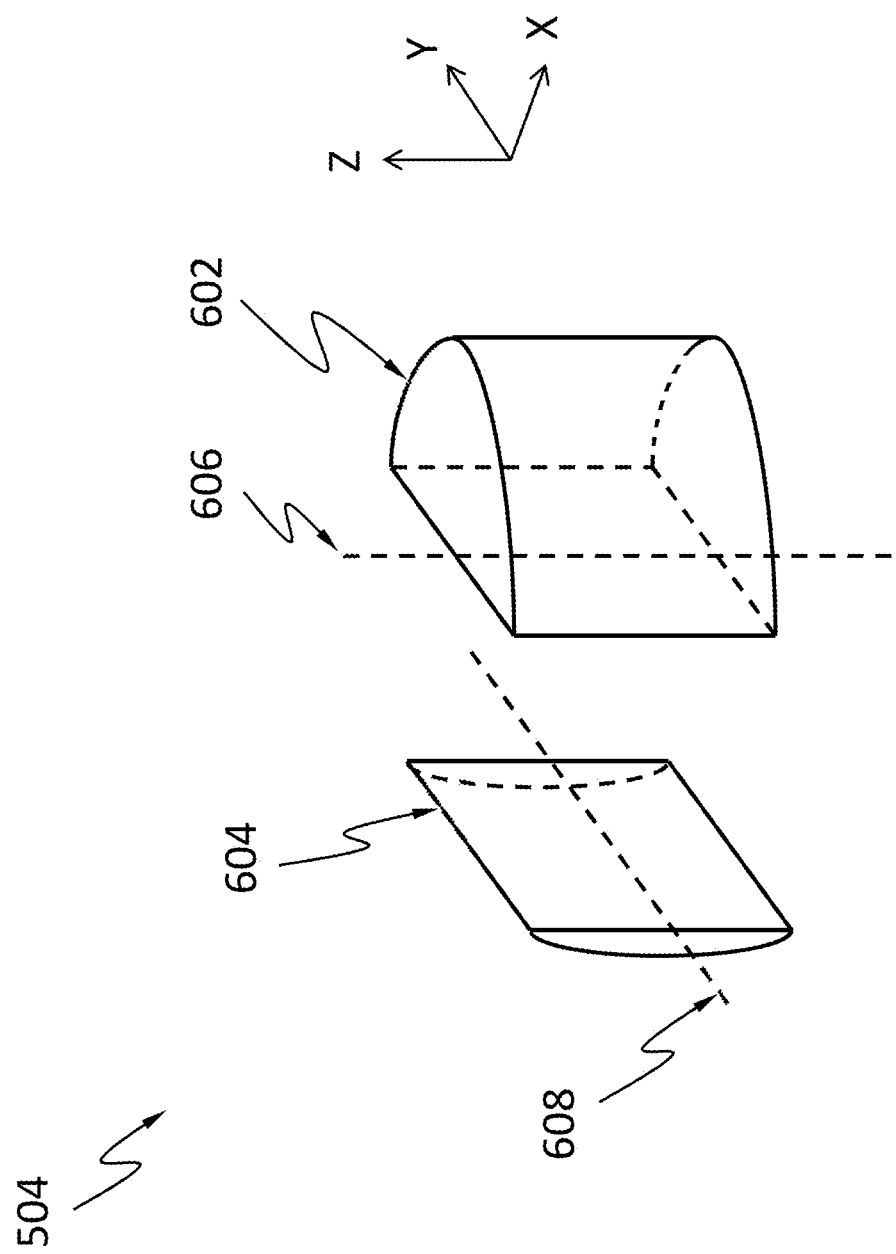
FIG. 6A schematically shows a perspective view of optics that may be used in the system of FIG. 5, according to one embodiment.

FIG. 6A schematically shows a perspective view of optics 504 that may be used in the system of FIG. 5, according to one embodiment. The optics 504 may comprise a first cylindrical lens 602 and a second cylindrical lens 604. The first and second cylindrical lenses 602 and 604 may be separated from each other.

Figure 6B:
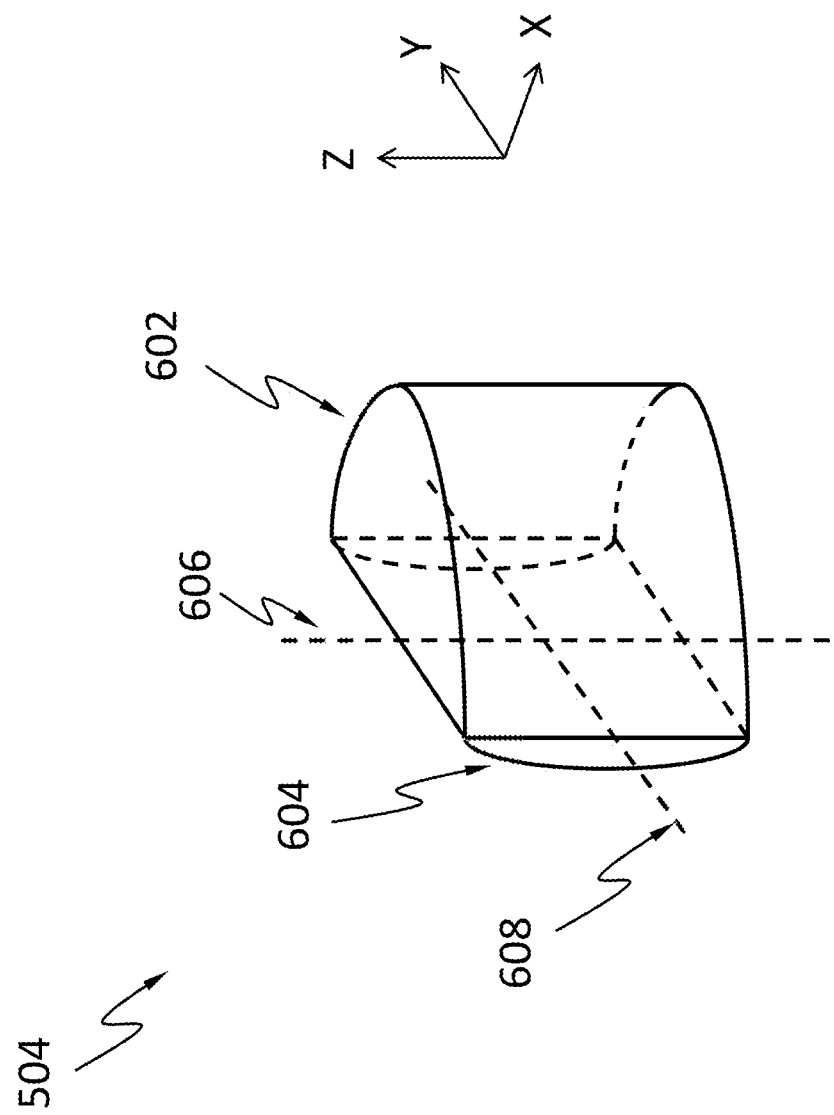
FIG. 6B schematically shows a perspective view of optics that may be used in the system of FIG. 5, according to an embodiment.

FIG. 6B schematically shows a perspective view of optics 504 that may be used in the system of FIG. 5, according to an embodiment. The optics 504 may have the first and second cylindrical lenses 602 and 604, according to another embodiment. The first and second cylindrical lenses 602 and 604 may be attached to each other. In example of FIG. 6B, the rectangular face of the first cylindrical lens 602 attaches to the rectangular face of the second cylindrical lens 604.

In an embodiment, the first cylindrical lens 602 and the second cylindrical lens 604 may be arranged orthogonal to each other, that is, the axial axis of the first cylindrical lens 602 (e.g., dashed line 606 in Z direction in FIGS. 6A and 6B) is perpendicular to the axial axis of the second cylindrical lens 604 (e.g., dashed line 608 in Y direction in FIGS. 6A and 6B). In an embodiment, each focal length of the first and second cylindrical lenses 602 and 604 may be positive. In example of FIG. 6A and FIG. 6B, both the first and second cylindrical lenses 602 and 604 may have a plano-convex configuration. The focal length of the first cylindrical lens 602 may be shorter than the focal length of the second cylindrical lens 604.

A cylindrical lens may be used to focus an incoming light to a line, or to change the aspect ratio of an image. In an embodiment, the first cylindrical lens 602 may be configured to receive the return light waves when the apparatus 100 steers the scanning light beam in the second dimension, and to converge the return light waves incident thereon in the second dimension. The second cylindrical lens 604 may be configured to further converge the return light waves after passing through the first cylindrical lens 602 in the first dimension.

Figure 6C:
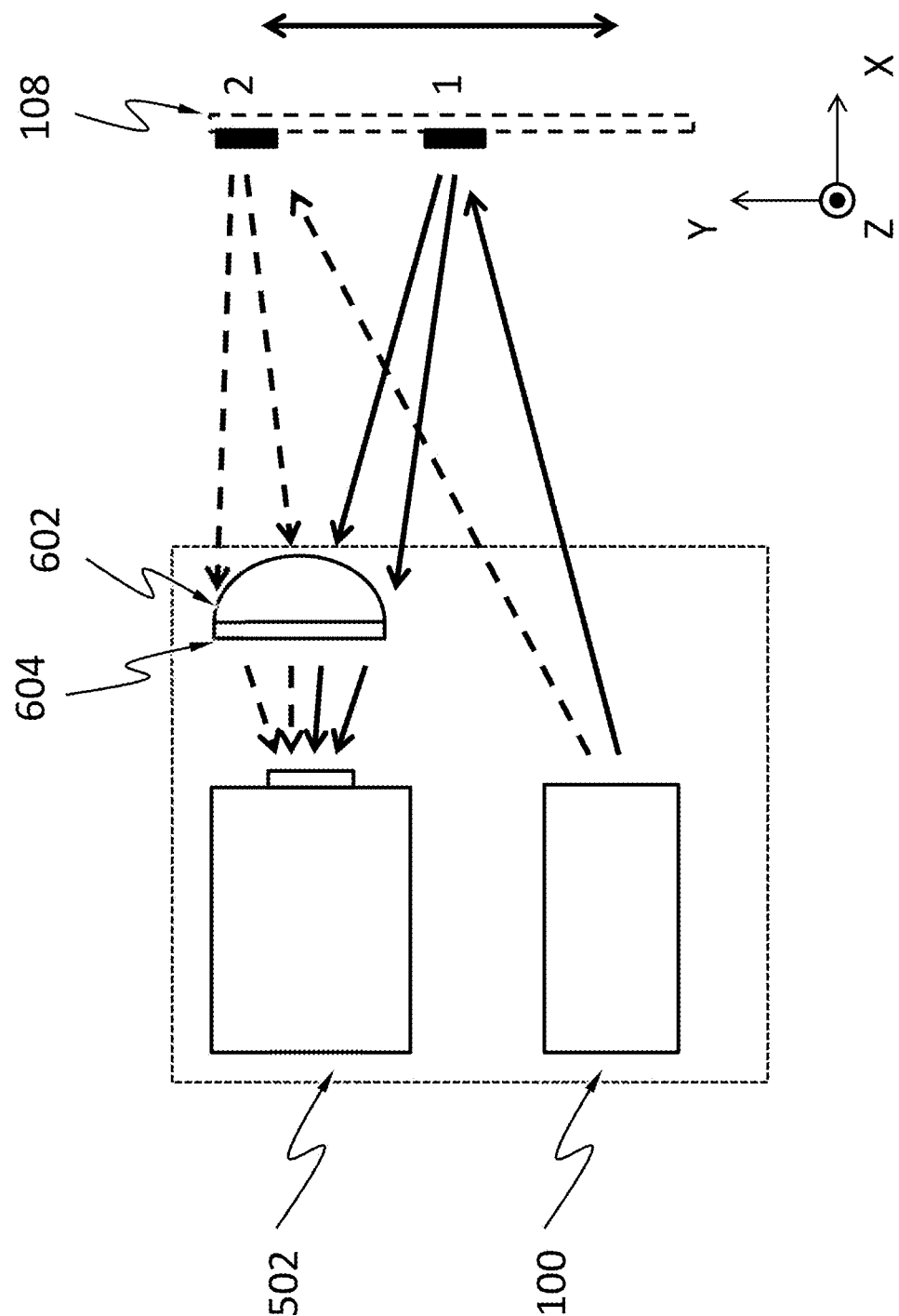
FIG. 6C schematically shows a top view of the system of FIG. 5 with the optics of FIG. 6B, according to an embodiment.

FIG. 6C schematically shows a top view of the system 500 of FIG. 5 with the optics of FIG. 6B, according to an embodiment. The system 500 has the apparatus 100 and the detector 502. The detector 502 may have optics, comprising the first cylindrical lens 602 and the second cylindrical lens 604. The first cylindrical lens 602 may be positioned between the target scene 108 and the second cylindrical lens 604. In example of FIG. 6C, the axial axis of the first cylindrical lens 602 is in the Z direction (e.g., pointing out of the X-Y plane) and the curved face of the first cylindrical lens 602 is facing toward the target scene 108. The axial axis of the second cylindrical lens 604 is in Y direction, and the curved face of the second cylindrical lens 604 is facing toward the light receiver of the detector 502.

When the scanning light beam illuminates a line at a first position (position 1 in FIG. 6C) on the target scene 108, the return light waves from the illuminated line at the first position may hit different locations on the curved face of the first cylindrical lens 602. The first cylindrical lens 602 may converge the return light waves incident thereon in the Y dimension. The second cylindrical lens 604 may further converge the returned light waves in the Z dimension so that the converged return light waves are within the detection range of the detector 502 and received by the light detecting elements of the detector 502.

When the apparatus 100 steers the scanning light beam in the Y direction and the illuminated line on the target scene 108 moves up from the first position to a second position (e.g., position 2 in FIG. 6C), the return light waves from the illuminated line at the second position may hit the curved face of the first cylindrical lens 602 at locations different from the return light waves from the illuminated line at the first position. The first cylindrical lens 602 may also converge the return light waves from the illuminated line at the second position incident thereon in the Y dimension. The second cylindrical lens 604 may further converge the returned light waves in the Z dimension so that the converged return light waves from the illuminated line at the second position are also within the detection range of the detector 502 and received by the light detecting elements of the detector 502.

Figure 7:
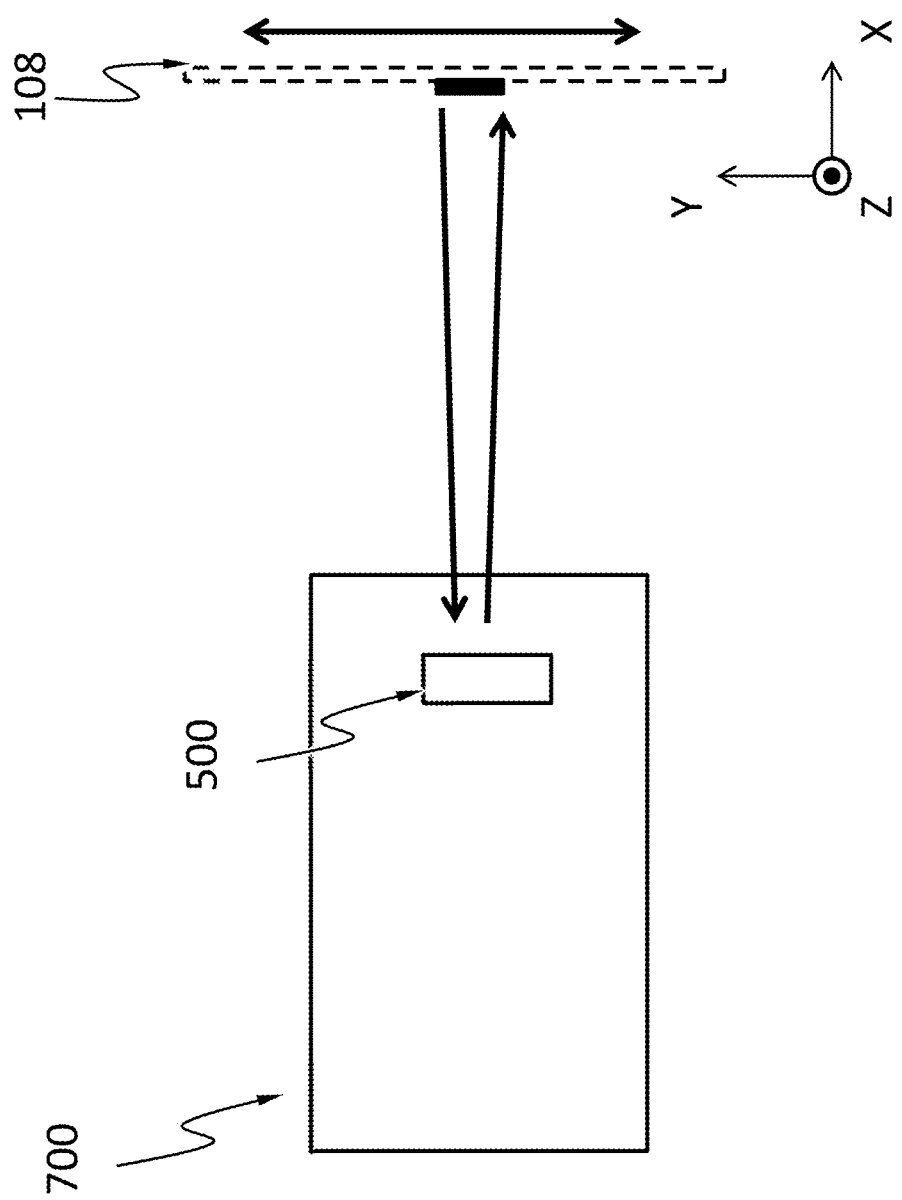
FIG. 7 schematically shows a lidar, according to an embodiment.

FIG. 7 schematically shows a lidar 700, according to an embodiment. The lidar 700 has the system 500 described herein. For example, the lidar 700 may be mounted on a vehicle and used as an on-vehicle Lidar. The lidar 700 may be configured to generate a scanning laser beam and detect return laser signals after the scanning laser beam bounces off an object, building or landscape in the target scene 108. In one embodiment, the distance and shape of the object, building or landscape may be obtained.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An apparatus, comprising:
   a light source, and a photonic crystal;
wherein the light source is configured to direct a light beam along an optical axis toward the photonic crystal;
wherein the photonic crystal is configured to direct the light beam along a direction at an angle relative to the optical axis, toward a partial toroid lens configured to diverge the light beam;
wherein the angle is a function of wavelength of the light beam.

2. The apparatus of claim 1, wherein the light source is configured to change the wavelength continuously across a range of wavelengths.

3. The apparatus of claim 2, wherein the range of wavelength is within 700 nm-1 mm.

4. The apparatus of claim 2, wherein the range of wavelength is within 400 nm-700 nm.

5. The apparatus of claim 1, wherein a derivative of the angle with respect to the wavelength is greater than 1.8°/nm.

6. The apparatus of claim 1, wherein a derivative of the angle with respect to the wavelength is greater than 2.1°/nm.

7. The apparatus of claim 1, wherein the partial toroid lens comprises a section of a toroid.

8. The apparatus of claim 7, wherein the section has a toroidal angle greater than 90°.

9. The apparatus of claim 1, wherein the partial toroid lens is configured to diverge the light beam continuously along a dimension.

10. The apparatus of claim 1, wherein the partial toroid lens is configured to diverge the light beam into a plurality of discrete directions.

11. The apparatus of claim 1, wherein the partial toroid lens is configured to direct the light beam toward a target scene.

12. The apparatus of claim 11, further comprising a detector configured to detect a portion of the light beam scattered by the target scene.

13. The apparatus of claim 12, wherein the detector comprises a first cylindrical lens and a second cylindrical lens, wherein the first cylindrical lens is positioned between the target scene and the second cylindrical lens.

14. The apparatus of claim 13, wherein the first cylindrical lens is configured to converge in a first dimension the portion of the light beam, wherein the second cylindrical lens is configured to converge in a second dimension the portion of the light beam after it passes through the first cylindrical lens.

15. The apparatus of claim 13, wherein a focal length of the first cylindrical lens and a focal length of the second cylindrical lens are positive, wherein the focal length of the first cylindrical lens is shorter than the focal length of the second cylindrical lens.

16. The apparatus of claim 12, wherein the detector is configured to generate electrical signals based on the portion of the light beam.

17. The apparatus of claim 16, further comprising a processor configured to process and analyze the electrical signals.

18. The apparatus of claim 1, wherein the light beam is a laser beam.

* * * * *